United States Patent
Pompelio

(10) Patent No.: US 11,711,238 B2
(45) Date of Patent: Jul. 25, 2023

(54) METHODS FOR OPERATOR CONTROL UNIT AND PAYLOAD COMMUNICATION

(71) Applicant: Stevyn Pompelio, Morris Township, NJ (US)

(72) Inventor: Stevyn Pompelio, Morris Township, NJ (US)

(*) Notice: Subject to any disclaimer, the term of this patent is extended or adjusted under 35 U.S.C. 154(b) by 99 days.

(21) Appl. No.: 16/896,129

(22) Filed: Jun. 8, 2020

(65) Prior Publication Data

US 2020/0403822 A1 Dec. 24, 2020

Related U.S. Application Data

(60) Provisional application No. 62/864,551, filed on Jun. 21, 2019.

(51) Int. Cl.
*H04L 12/40* (2006.01)
*H04L 9/40* (2022.01)

(52) U.S. Cl.
CPC .. *H04L 12/40052* (2013.01); *H04L 12/40084* (2013.01); *H04L 12/40117* (2013.01); *H04L 63/0428* (2013.01)

(58) Field of Classification Search
CPC ............ H04L 63/126; H04L 12/40084; H04L 12/40117; H04L 63/0876; H04L 12/40052; H04L 63/0428; H04L 63/102
See application file for complete search history.

(56) References Cited

U.S. PATENT DOCUMENTS

| | | | |
|---|---|---|---|
| 8,473,140 B2 | 6/2013 | Norris et al. | |
| 8,612,051 B2* | 12/2013 | Norman | H04L 63/0428 700/248 |
| 8,725,273 B2 | 5/2014 | Lenser et al. | |
| 9,665,096 B2 | 5/2017 | Field et al. | |
| 2007/0198144 A1* | 8/2007 | Norris | G05D 1/0061 701/23 |
| 2008/0126882 A1* | 5/2008 | Fulton | G05B 19/058 714/48 |
| 2009/0044655 A1 | 2/2009 | DeLouis et al. | |
| 2009/0265036 A1 | 10/2009 | Jamieson et al. | |
| 2013/0050121 A1* | 2/2013 | Bruemmer | B25J 9/1684 345/173 |
| 2013/0054024 A1* | 2/2013 | Bruemmer | B25J 9/1694 901/1 |
| 2014/0350768 A1* | 11/2014 | Filippov | G05D 1/021 701/23 |
| 2015/0195297 A1* | 7/2015 | Ben Noon | H04L 63/1408 726/22 |
| 2019/0036705 A1* | 1/2019 | Meriac | H04L 9/321 |
| 2019/0052653 A1* | 2/2019 | Galula | B60R 16/02 |
| 2019/0232486 A1* | 8/2019 | Kayser | B25J 9/142 |
| 2020/0001471 A1* | 1/2020 | Chen | B25J 13/081 |
| 2021/0016433 A1* | 1/2021 | Bidram | B25J 9/14 |
| 2021/0258764 A1* | 8/2021 | Zhang | H04W 8/005 |

* cited by examiner

*Primary Examiner* — Oussama Roudani
(74) *Attorney, Agent, or Firm* — Sleman & Lund LLP

(57) ABSTRACT

A method of communication between a payload and a platform, including providing power to at least one payload via a platform, periodically sending an identification message from the at least one payload to the platform, decoding the identification message with the platform and sending a response message to the at least one payload, requesting access to one or more ethernet busses supplied by the platform, and enabling the one or more ethernet busses.

10 Claims, 13 Drawing Sheets

CUSTOM MESSAGE OBJECT ENCODING & DECODING

PAYLOAD DEFINED HUMAN-MACHINE INTERFACE

METHODS FOR OPERATOR CONTROL UNIT AND PAYLOAD COMMUNICATION

CROSS-REFERENCE TO RELATED APPLICATIONS

This application claims priority to U.S Provisional Patent Application Ser. No. 62/864,551, filed Jun. 21, 2019, the contents of which is hereby incorporated by references in its entirety as if fully set forth herein.

FIELD OF THE DISCLOSURE

The present disclosure generally relates to mobile robots. More particularly, the present disclosure relates to devices, systems and methods for communication between an operator control unit and one or more payloads.

BACKGROUND OF THE DISCLOSURE

Robots are useful in a variety of civilian, military, and law enforcement applications. For instance, some robots may inspect or search buildings with structural damage caused by earthquakes, floods, or hurricanes, or inspect buildings or outdoor sites contaminated with radiation, biological agents such as viruses or bacteria, or chemical spills. Some robots carry appropriate sensor systems for inspection or search tasks. Robots designed for military applications may perform operations that are deemed too dangerous for soldiers. Law enforcement applications include reconnaissance, surveillance, bomb disposal and security patrols.

Small robots are useful for many applications, and the application may be chosen by equipping the robot with one or more accessories, often called payloads. Such payload may include arms, cameras, sensors, grippers and the like. Unfortunately, common robots are limited by various constrains. In some cases, a robot may require a change in its payloads. In such cases, a fielded robot with a first payload is recalled to a maintenance depot, and its operator control unit (OCU) is updated prior to attaching a different payload. This limitation is cumbersome, time-consuming and expensive.

For example, in military applications, unmanned systems tend to follow a similar acquisition strategy: requirement for the system is established, OCU and unmanned systems are designed, built, tested, and fielded. But shortly after fielding, the operating environment changes, the threats react, and eventually the unmanned system needs an upgrade. This poses a challenge to DoD Program Managers and the DoD technology labs throughout the different services. The labs are tasked to develop new payloads, which entails changing the existing software of fielded systems. In many cases, an effort to field even the simplest improvement can take years and the logistics costs of retrofitting and upgrading the platform can dwarf the payload costs. These costs and lead times along with system availability make it difficult to field new capabilities to the warfighters.

SUMMARY OF THE DISCLOSURE

In some embodiments, method of communication between at least one payload and a platform includes providing power to the at least one payload via a platform, periodically sending an identification message from the at least one payload to the platform, decoding the identification message with the platform and sending a response message to the at least one payload, requesting access to one or more ethernet busses supplied by the platform, and enabling the one or more ethernet busses.

In some embodiments, a method of communicating between a first payload and a second payload includes broadcasting, from the first payload, a discovery message, receiving the discovery message with the second payload, responding to the broadcast message by sending, from the second payload, at least one definition, generating a combined model of the at least one definition from both the first payload and the second payload, avoiding operational conflicts with other payloads, and sending updated definitions as required.

BRIEF DESCRIPTION OF THE DISCLOSURE

Various embodiments of the presently disclosed devices, systems, and methods are shown herein with reference to the drawings, wherein.

Figure 10A:
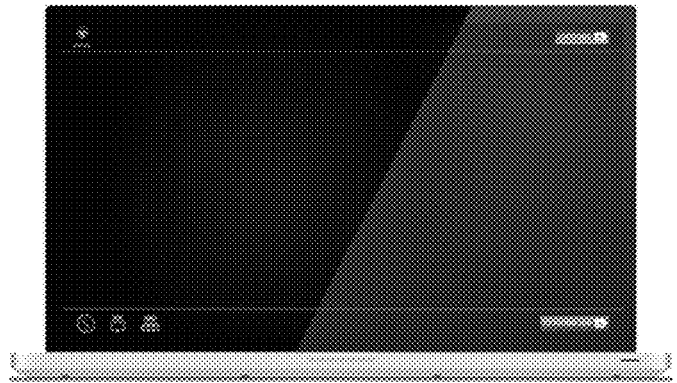
Figure 10B:
Figure 11:
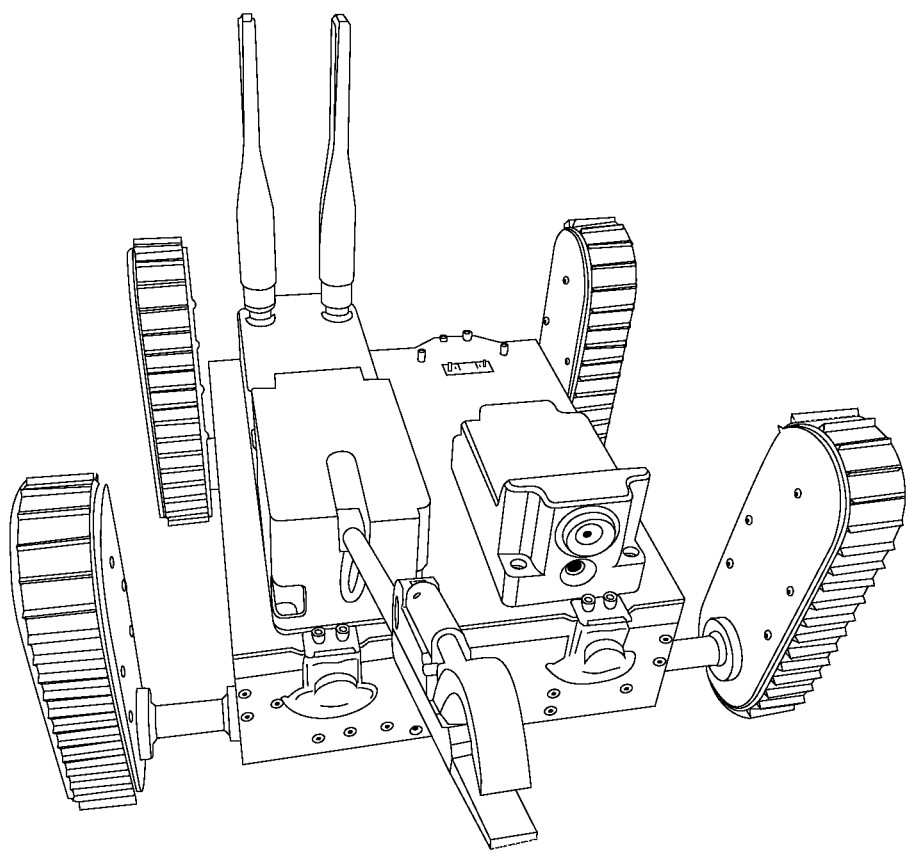
Figure 12A:
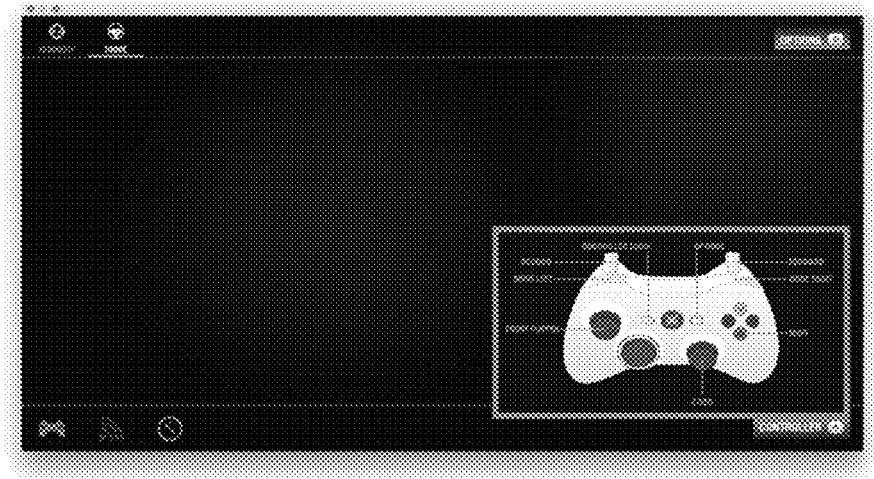
Figure 12B:
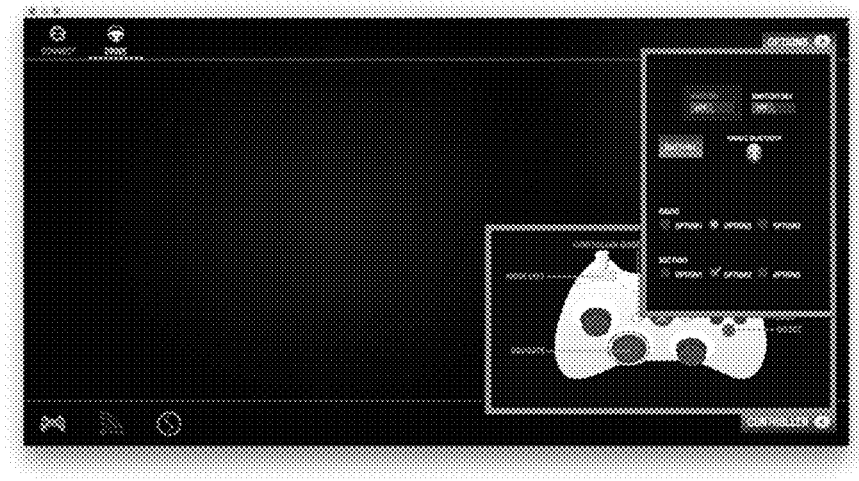

FIGS. 10A-B are schematics showing the OCU screen before and after a payload is plugged in;

FIG. 11 is one example of an unmanned platform implementing the system and methods described herein; and FIGS. 12A-B are schematics showings a controller being mapped to certain functions.

Various embodiments of the present invention will now be described with reference to the appended drawings. It is to be appreciated that these drawings depict only some embodiments of the invention and are therefore not to be considered limiting of its scope.

DETAILED DESCRIPTION

Despite the various improvements that have been made to robots and their communication with payloads, conventional systems and methods suffer from some shortcomings as described above.

The present disclosure provides systems and methods designed to exercise standard message protocols in an architecture designed for true plug-and-play payloads. According to the present disclosure, unmanned systems may receive swappable payloads without having to recall the Operator Control Unit (OCU) to be reprogrammed to support a new payload.

The present disclosure provides a software layer sitting on top of an open architecture unmanned platform, implemented on both the OCU and the payload as will be described in more detail below. The methods and systems described herein may be implemented on different OCUs and payloads. On an OCU, the system serves as the primary software between the operator and their system. Inside a payload, the system provides information to the rest of the system over standard protocols.

The OCU is the key interface between the human operator and the unmanned system providing safety standoff or remote surveillance. An OCU may include one or more computer processors and associated memory systems. An unmanned ground vehicle is usually tasked with locating, interrogating, and disrupting dangerous devices. These devices may include improvised explosive devices, unexploded ordnance, or anything else a human operator would prefer to be far away from. Unmanned aerial vehicles may surveil their environment, discharge conventional weapons, and conduct electronic warfare. According to the present disclosure, both types of unmanned systems (i.e., ground, surface, submersible and/or aerial) may benefit from self-contained payloads communicating directly to the OCU through the infrastructure provided by the platform.

Figure 1A:
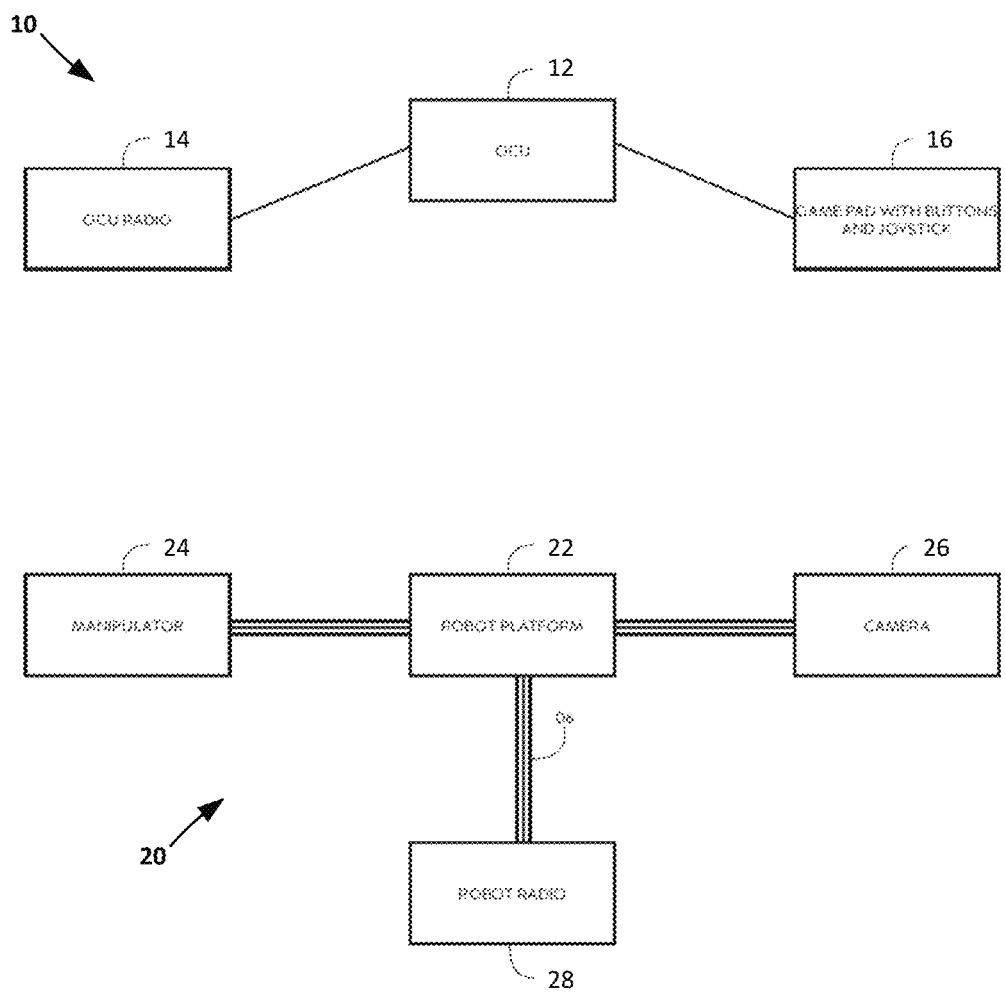
FIG. 1A is a diagram of a robotic system overview.

FIG. 1A is an overview of a robotic system. The system generally includes two modules: a control module 10, and a vehicle module 20. Control module 10 includes operator control unit 12, which is the primary system the operator uses to teleoperate the robotic vehicle and attached payloads. A radio 14 may be coupled to, and in communication with the OCU. Radio 14 may be located internally to laptop OCU or separate as an external payload. An optional controller 16, such as a gamepad (e.g, video game controller) may provide the user an intuitive interface to move and articulate the platform and payloads as well as on-screen OCU navigation. The vehicle module 20 may include a robot platform 22, which serves as the hub to distribute power and/or data between payloads. Platform 22 may optionally support mobility components such as tracks, wheels, and the like. Platform 22 may be coupleable to a number of payloads. In FIG. 1A, platform 22 is coupled to a manipulator payload 24 consisting of an articulating arm and end effector (gripper) to allow the operator to remotely interact with the environment. A camera payload 26 provides visual feedback to the user. Optionally, camera payload 26 may articulate and provide illumination to increase the field of view and objects at a distance or in low light environments. A robot radio payload 28 may provide communication between the platform and the OCUs. Robot radio may use 802.11 WiFi and may manage an ad-hoc or access point network. Payloads may be coupled to the platform with a common interface between the platform and payloads to provide power, ethernet, CAN bus, and/or EIA-232 serial port connectivity.

Figure 1B:
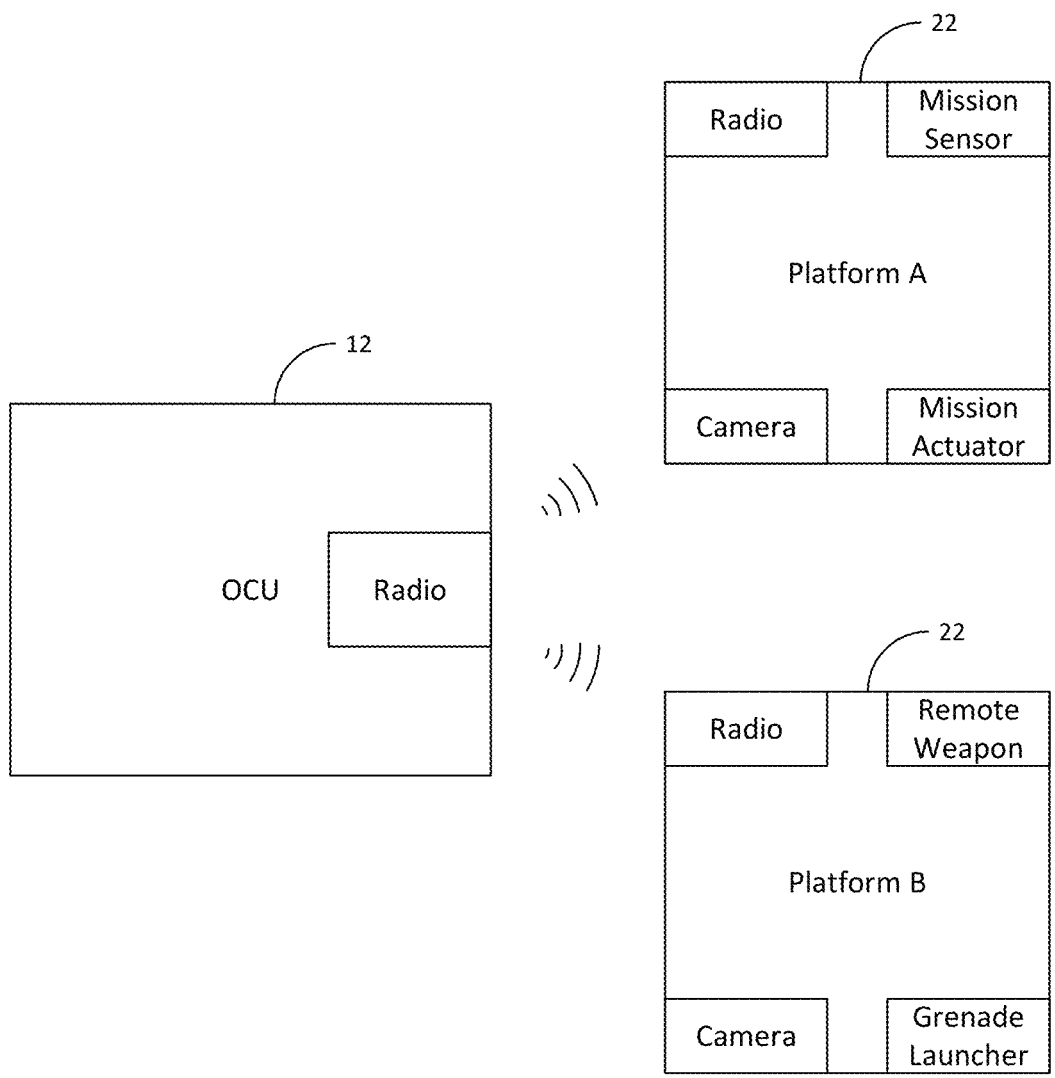
FIG. 1B is a diagram showing an OCU in communication with multiples platforms.

As shown in FIG. 1B, a single OCU 12 may communicate via radio with multiple platforms. In this examples, platform A and platform B have different payloads. Additionally, the same controller may be used to control both platforms. According to the present disclosure, the payload provides integration with the rest of the platform and OCU and is ready for use by the operator. The present disclosure achieves this without requiring that the OCU know about the payload ahead of time. That is, no update to the OCU is necessary prior to equipping the system with a new payload. Instead, the system is designed so that the payload teaches the OCU how to talk to it. When a payload is plugged in to the platform and the system powered on, the payload will be able to communicate to the system through an Ethernet bus. Messages compliant with the Robotics and Autonomous Systems-Ground Interoperability Profile (RAS-GIOP) standards will allow the components to discover each other. A special JAUS service compliant to AS5684 (https://www-.sae.org/standards.content/as5684/) was developed so the OCU can interrogate the payload and request its system definition. The definition message may provide a link to a series of files accessible over Hyper Text Transfer Protocol (HTTP) or Hypertext Transfer Protocol Secure (HTTPS) that further define the payload components for the OCU. HTTP/HTTPS is used as is supports easy transfer of files using the benefits of Transmission Control Protocol (TCP) and due to its ubiquity is easy to support on almost any payload. These components include a link to user interface elements, hand controller requests, and all elements needed to fully integrate any payload into an unmanned system.

FIGS. 10A and 10B show the OCU screen before and after a payload is plugged in. The definition files provided by the payload are interpreted rather than executed. Using an interpreted language rather than a compiled language, the payload definition files can be processed by a number of OCUs and other payloads. This alleviates the need to target a particular CPU architecture or operating system that the payload's definition file must be compatible with. Therefore, the same definition file can integrate, on-the-fly, with the system being implemented on Windows, Linux, iOS, MacOS, and Android OCUs and payloads using CPU architectures such as Intel or ARM.

In some examples, the system may support multiple payloads and will dynamically reconfigure the interface to give the operator the experience that the total set of payloads was designed as one complete system. This technology allows capability payload designers the flexibility to mix and match, improve, and upgrade capabilities without needing to develop and field a new configuration of the software. The messages provided by the payload are interpreted at runtime and do not have to be saved on the OCU or other payloads. This allows the OCU and other payloads to maintain their software, hardware, and firmware configuration and avoids the added cost and complexity of becoming a unique item in logistics systems, such as those of the DoD. The OCU configuration never changes which means an OCU may be used on multiple systems without requiring any update or configuration change. On power up, an OCU that connects to an unmanned ground vehicle may be identical to an OCU that connects to an unmanned aerial vehicle. It is up to the platform configuration and connected payloads to define the rest. The platform configuration is actually treated the same way as any other payload. This configuration allows controls such as driving or flying to be treated the same way as rotating a camera.

Hand controllers are one of the main interfaces between the operator and the OCU. However, a payload may be connected to different platforms that use joysticks, gamepads, and touch controls. The present disclosure solves this by abstracting the payload's needs into requests that are fulfilled by the particular OCU software. A payload may request an analog joystick to control steering and the OCU fulfills that request then shows the operator a diagram of how the features are mapped to physical actions. This allows the OCU to be realized in different form factors while supporting the same platform payloads.

Aside from providing basic user interface elements such as text fields, buttons, drop down menus, and other indicators, a powerful scripting engine is used to give the payload a great deal of flexibility in how the OCU interacts with it. These interactions, messages over the radios between the OCU and the payload through the platform, must not be propriety but utilize established messaging standards. During the payload interrogation process, the payload provides the standard JSIDL message definition in XML defined by AS5684 to the OCU so the system can learn how to talk to it. This feature allows the OCU to learn new JAUS messages based on the definition provided by the payload.

In some examples, the OCU may display a three-dimensional model of the platform and any attached payloads. This model will build itself as more payloads attach and change its shape depending on messages from the payloads. For a ground vehicle with articulators, this may show an articulator rotating around an axis as the robot moves around. For aerial vehicles, this may be represented by rotary wings or changing the orientation as the platform moves. In either case, the platform designer knows what their platform looks like and the payload designer knows their payload. The 3D models contained in each will be aggregated by the OCU to provide the operator a complete picture of the unmanned system as it interacts with its surroundings.

The system may further include security features, such as hardware features to impose security on the platform side. In one example, when a payload is connected, it receives power but not an Ethernet connection. A cryptographic exchange is performed by the payload to the platform over the EIA/TIA-232 standard using a symmetric key challenge and response along with an asymmetric key signature. Once the payload has properly identified itself, the Ethernet port is unlocked and available to the payload. Only payloads authorized by a program manager or other end customer may gain trust of the system. To the operator this occurs in the background in a fraction of a second and in no substantial way impacts setup time. In addition to these security features, all scripts defined by the payload and interpreted by the system operate in a sandbox. This sandbox environment prevents unauthorized access to the rest of the OCU system and one payload affecting another.

FIG. 11 shows an unmanned platform that implement the system and methods described herein. The platform is a lightweight (e.g., less than 20 pounds) chassis with four rotating tracked flippers. Small ground robots usually suffer from limited mobility and the four rotating tracks allow the robot to drive through rough outdoor and urban terrain. The upper surface reveals four payload mounting connections complete with four payload connectors. Each payload connector provides power, Ethernet, and a connection to the Aurelius Unlock system. Each payload port and mounting position is the same so the operator can rearrange payloads as desired. According to the present disclosure, even well after the system is fielded, the operator may add and remove payloads (e.g., an arm, gripper, camera, radio, or other sensor) without ever having to update the system.

Initially, the payload must identify itself with the robot chassis in order to gain connectivity identify its physical location on the chassis (payload port A versus payload port C). After that it has ethernet connectivity and can receive broadcast message from the OCU, chassis, and other payloads. Once a broadcast message is received, a response is generated which starts a chain of events for the OCU to configure itself to talk to the payloads of the robotic system. This includes the payload sending a message that reports the services it provides, along with an HTTP/HTTPS URL to a definition file in the Qt Modeling Language (QML) format that is interpreted by the OCU and instantiates multiple components for the user interface. The QML file also provides HTTP/HTTPS links to XML files conforming to AS5684 that provides the definition of the message interface specification of the previously defined services they payload implements. This means a set of messages that the OCU has never been programed to communicate with are provided by the payload and interpreted by the OCU at a high level so it can talk to the payload as a low level confirming to the AS5684 standard.

Other implementations of the AS5684 standard use software code generators that send messages in a particular format but are not dynamic, meaning they would need to be reprogrammed and reconfigured for every new payload. According to the present disclosure, the system interprets the XML file describing the definition according to the standard and is able to send and receive messages without the OCU needing to be reprogrammed or reconfigured. This is done by loading the XML file into a tree structure and then generating outgoing or parsing incoming messages based on that tree structure.

Once the underlying communication is established, the OCU may map the functions of the payload to the human-machine interface components such as keyboard and game pad. In its current implementation, an Xbox hand controller is used. There are several hard-coded buttons that the OCU uses for navigation but the remaining buttons and axes are made available to the different payloads. In the QML file are generally defined requirements the payload has for the OCU. For example, driving requires a forward ax, reverse ax, and a directional ax. The OCU software maps these general requirements to specific variable ax controls like sticks and triggers. This provides flexibility if a different controller were used with the same payload. The payload would be transferable to different chassis or OCUs without the need for reconfiguration. This is performed by matching the requirements of the payload to the capabilities provided by the controller. An on-screen image showing which functions are mapped to which buttons and axes are shown to the operator so they know which buttons to press (FIG. 12A).

Enhanced capabilities like including a special function like "Shift" allow the payload to load more requirements than may be physical achievable by a single controller. If the user presses the shift button, the on-screen diagram and underlying control mapping will shift to an alternate view and control mapping.

After the messaging and control specifications are handled, the QML file may further define user interface elements such as video windows, maps, buttons, toggle switches, sliders, and even custom components unique to the payload. These elements can be used by a touch screen, mouse, or through Xbox controller navigation (FIG. 12B).

The details of the interaction between the various components of the system will now be described in greater detail.

Figure 2:
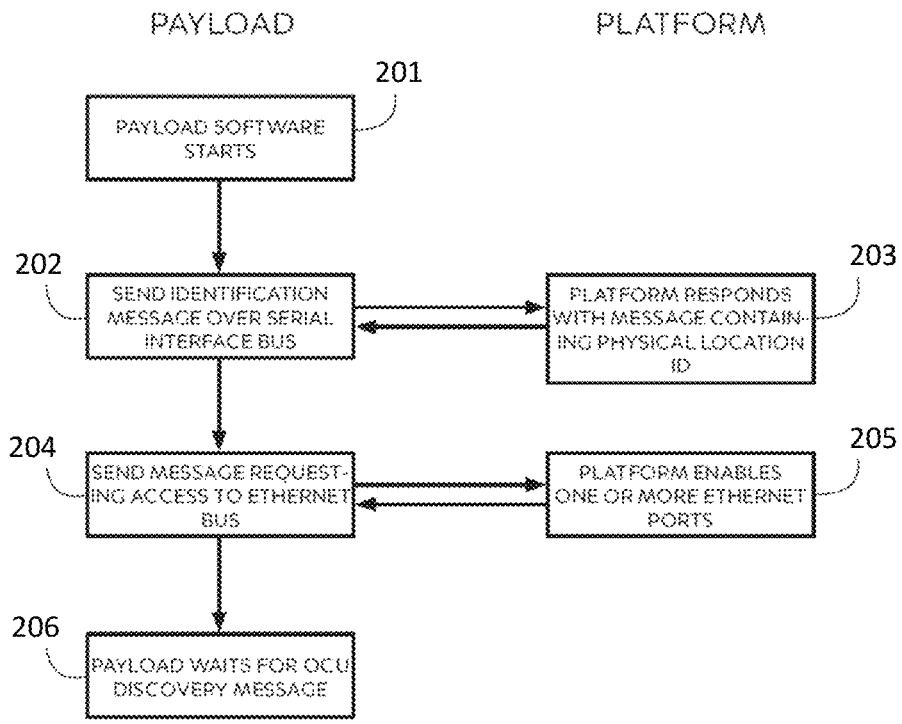
FIG. 2 is a diagram showing a method of payload-platform initialization.

FIG. 2 illustrates one example of payload-platform initialization. First an operator powers on the platform which provides power to the connected payloads (step 201). The platform operating system and software also start. The payload's operating system also starts and launches a primary application and any required background services. Each payload periodically sends an identification messages through the serial bus to the platform identifying itself and continues until a response is received (step 202). The identification message may contain the payload's make, model, version, serial number or other identifying information. Optionally, this message may include a cryptographic signature of the identifying information using a key provided by a third party. The platform decodes and responds to message and in the reply contains the identifier of the physical port to which the payload is attached (step 203). The response message may contain the platform's make, model, version, serial number or other identifying information. Optionally, this message may include a cryptographic signature of the identifying information using a key provided by a third party. The payload then sends a message to request access to one or more ethernet buses supplied by the platform (step 204). This message may be guarded by the platform's identifying information and digital signature. In response, the platform enables one or more ethernet busses (step 205). This action may be guarded by the payload's identifying information and digital signature. The payload waits for further incoming messages such as the discovery message from other payloads or the OCU (step 206).

Figure 3:
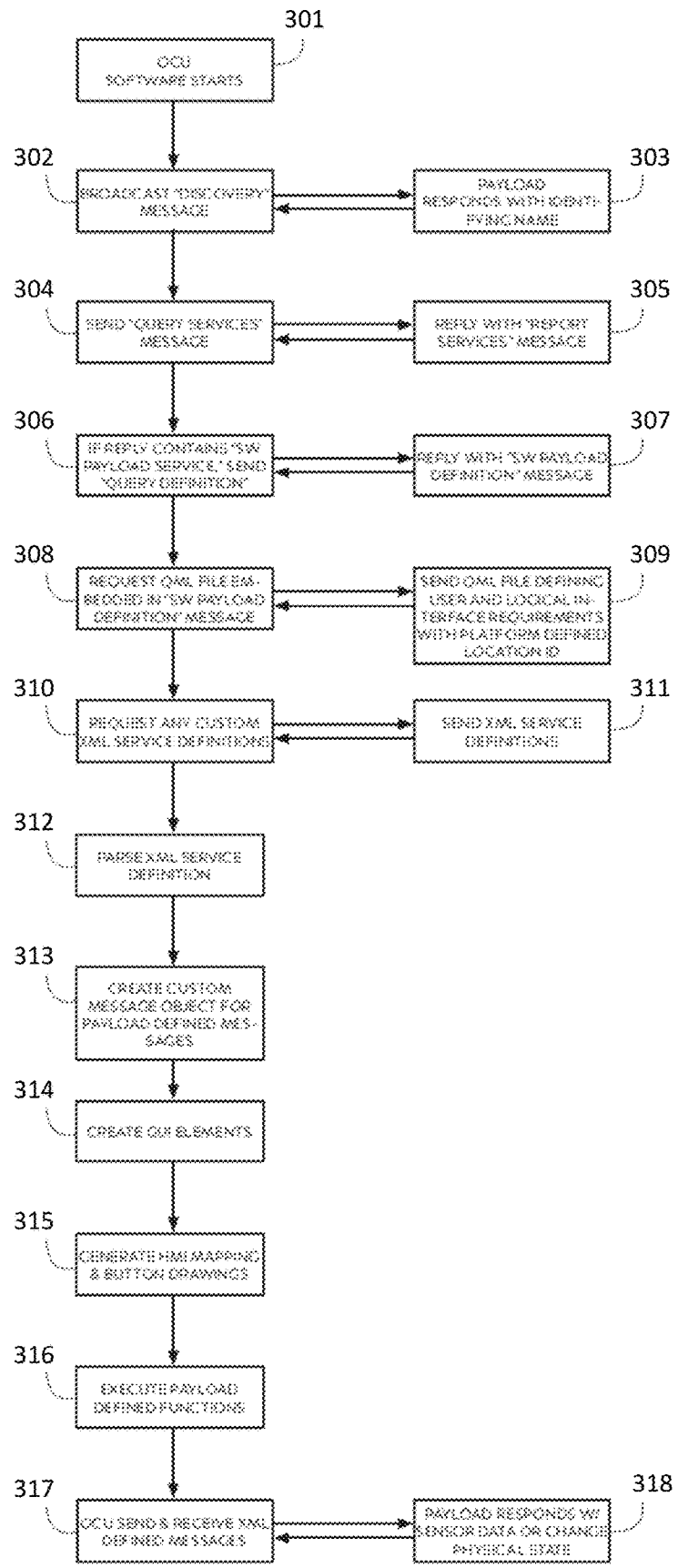
FIG. 3 is a diagram showing a method of payload discovery and initialization.

FIG. 3 illustrates one example of payload discovery and initialization. First, the operator powers on the system and operating system loads and launches primary OCU application and any necessary background services used to interact with payloads (step 301). Periodic "discovery" broadcast messages are sent to all connected payloads (step 302). The wired and wireless network will ensure the message is routed to all devices on the ethernet bus. The payload responds to the "discovery" message with a "report identification" message containing the name of the payload and a logical address, as defined in SAE AS5710, used for future message routing (step 303). The OCU sends a "query services" message to ask the payload to identify and name and version of the services the payload implements (step 304). In response, each payload replies with a list of services and their corresponding version number (step 305). The OCU will send a "Query Payload Definition" message directly to the payload using the logical address previously defined (step 306). The "Query Payload Definition" message may include capabilities and limitations of the OCU such as screen size, touch screen capabilities, hand controller capabilities, and/or keyboard capabilities. The payload responds with a "Report Payload Definition" message containing an HTTP/HTTPS link containing additional payload definitions (step 307). These definitions are generated at runtime based on the capabilities and limitations provided by the OCU. For example, a small screen OCU present on a phone may not be provided the same layout as desired for a large OCU such as a laptop. The capabilities and limitations provided for the OCU hand controller may also further refine the payload definition by incorporating multiple controls into a "up-down-left-right" directional pad or to split the controls into multiple "up-down" controls. This allows for the payload to tailor itself to a wide variety of OCU and hand controller interfaces. The OCU makes a request for message or response at the HTTP/HTTPS link (step 308). The payload responds with file contents over HTTP/HTTPS (step 309). The format of the message is in a plain text format such as QML or XML that can be read by a human or computer without needing to be compiled. The physical location ID provided by the platform is included in this message so the OCU can determine where the payload is physically located with respect to the platform. In some examples, the QML or XML definition file may include additional links to files in the SAE AS5684 format providing additional custom message definitions. If these are present, the OCU will send an HTTP/HTTPS request for these files (step 310). Each payload replies with the contents of the custom message definitions over HTTP/HTTPS (step 311). The OCU parses and validates the AS5684 formatted responses (step 312). Additionally, the OCU will create custom message objects for any supplied custom messages (step 313). These are used later to encode and decode custom messages they OCU otherwise has not been programed to understand. Any graphical user interface elements such as on-screen buttons, sliders, toggles, progress indicators, maps, video displays, images, and text the payload requires the OCU display to the operator to use the payload are created (step 314). Optionally, this may include tutorials or instructions for the operator so they may understand how to use a new payload. The OCU will also map any gamepad buttons or joystick controls to requests made by the payload defined in the QML or XML file (step 315). These requests are fulfilled as available and the payload may optionally define alternate requests or mappings based on what is available. Any payload-defined functions provided in a non-compiled language such as JavaScript are executed on the OCU so allow the payload to further configure the view on the OCU (step 316). Following initial identification, normal operation may begin. The OCU may send any payload defined messages in a bit patterned defined in AS5684 to the payload (step 317). Under normal operation, the platform may respond to these messages by changing its physical state or providing data from included sensors (step 318).

Figure 4:
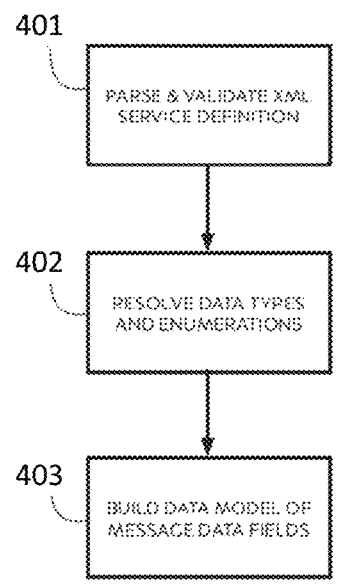
FIG. 4 is a diagram showing a custom message object.

FIG. 4 illustrates one example of a custom message object. Custom message objects are used to encode and decode AS5684 formatted messages at a higher level making it convenient for payload developers to construct and respond to messages between the OCU and payload. Traditional robotic systems require the OCU to have its software modified to utilize custom messages but by using custom message objects defined by the payload, the OCU does not need to be modified to talk to a new payload. The AS5684 defined XML files are parsed and validated based on rules defined in AS5684 (step 401). The custom defined data types such as numbers, strings, lists, arrays, enumerations, and modifiers to these types such as "optional", "required", or "mutually exclusive" as defined in AS5684 comprise a custom message object (step 402). A data model is constructed with these data types in a hierarchical format. This data model allows for conversion from multiple formats such as the bit pattern sent on the wire to the payload, a C++ interface, and a JavaScript interface so that the payload defined functions executed on the OCU can construct properly formatted messages that are processed by the payload in AS5684 format and decode responses from the payload in AS5684 format (step 403).

Figure 5:
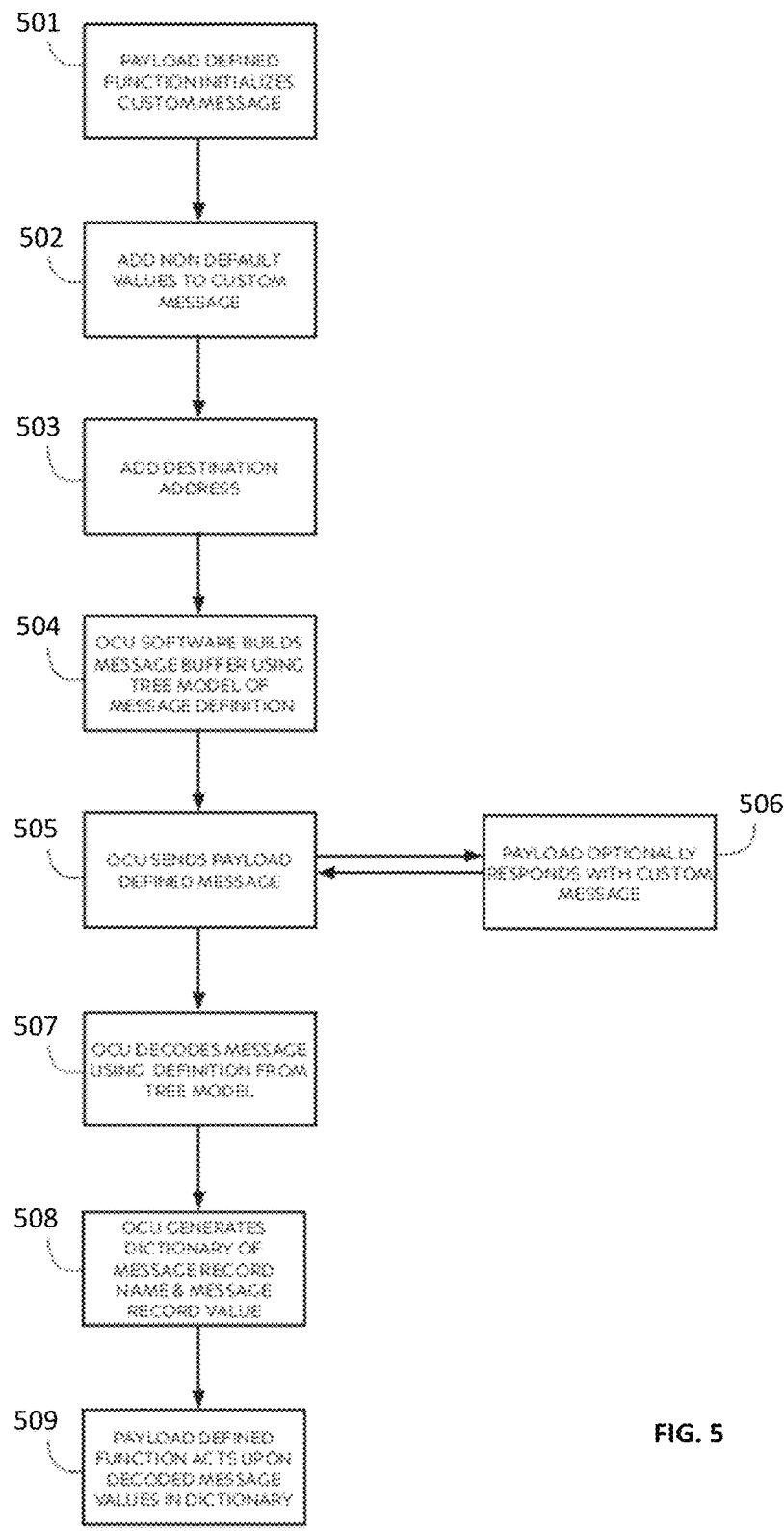
FIG. 5 is a diagram showing custom message encoding and decoding.

FIG. 5 illustrates one example of custom message object encoding and decoding. First, a payload defined JavaScript function is called by an event from either the operator or the OCU's payload management controller. This function creates a custom message object (step 501). Some messages have no arguments, optional argument, required arguments, or a mix of optional and required arguments. For any required argument necessary to make a message valid, the custom message object model will populate them with default values as defined (step 502). JavaScript functions that are provided by the payload and executed on the OCU can modify these arguments. For example, the operator pushes on the joystick causing an event to call a function which creates a message that tells the payload to rotate the camera counterclockwise. Rotating counterclockwise is one of the arguments required for the message. The destination address is added to the message header so it will be routed to the correct payload (step 503). The data model of the message builds the specific bit pattern defined in the XML definition to be sent to the payload (step 504). The OCU sends the message to the correct payload by mapping the AS5710 destination address to the payload's IP address (step 505). The payload may optionally respond to this message (step 506). The payload may also send messages periodically such as a heartbeat or sensor data like a GPS location. When the OCU receives the message from the payload, the bit pattern is decoded using the data model for the custom message object (step 507). Using the custom message object, a dictionary of arguments and values is generated that can be used for the C++ or JavaScript interface (step 508). A payload defined function executed on the OCU software may subscribed to incoming message events and process the message based on the dictionary of arguments and values (step 509). Since the message definition and corresponding functions processing the messages from the payload are all defined by the payload, the OCU is able to interact with a payload without any prior knowledge of how it operates and the discovery and initialization procedures teach the OCU how to talk to the payload.

Figure 6:
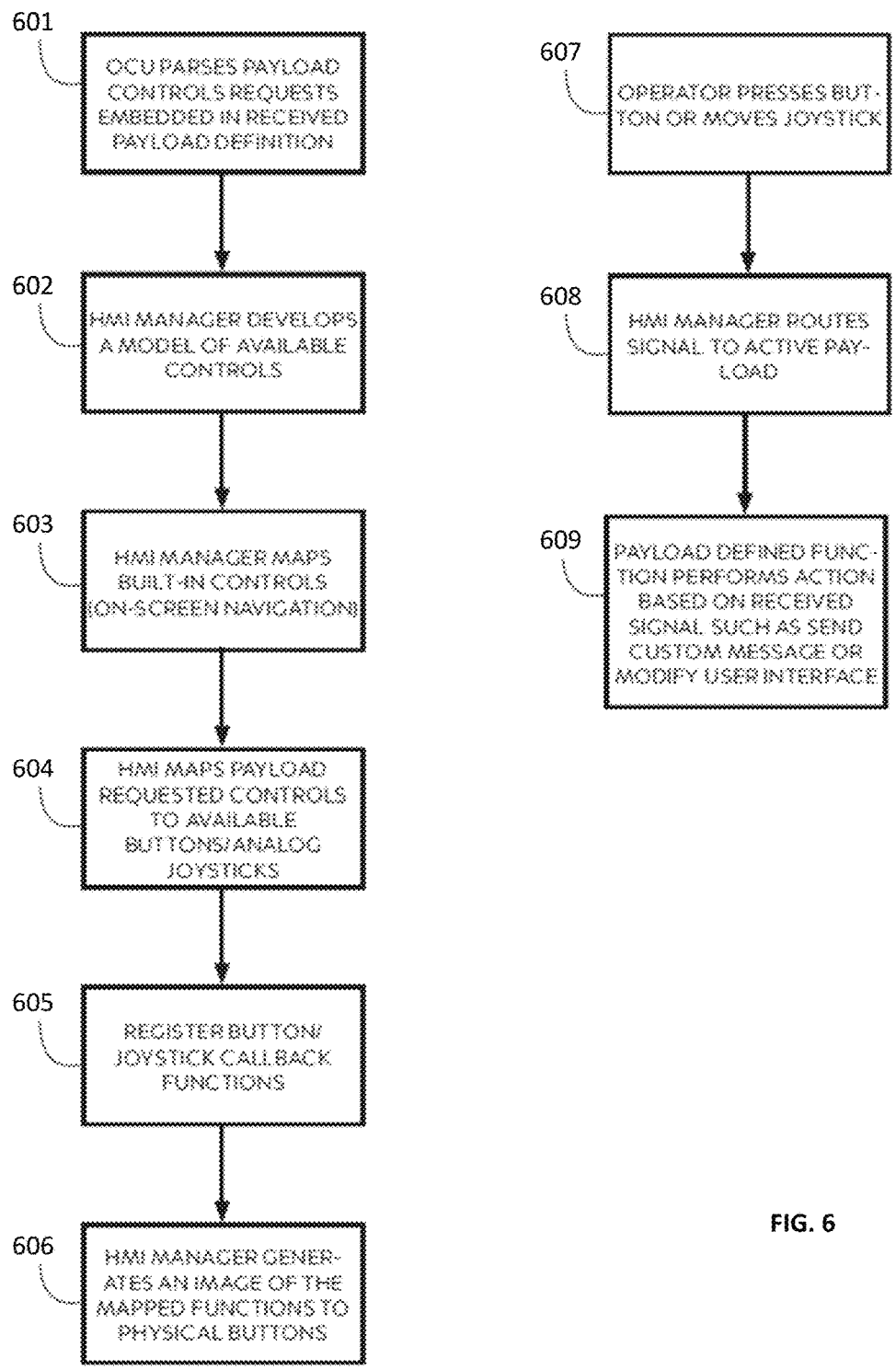
FIG. 6 is a diagram showing payload defined human-machine interface.

FIG. 6 illustrates one example of payload-defined human-machine interface. A payload may connect to different platforms and different OCUs and must not expect a specific human-machine interface (HMI). Rather than map functions to specific buttons, the HMI manager maps payload defined requests to real buttons or real joysticks. The payload definition in QML or XML defines a set of requests and corresponding callback functions that are executed on the OCU (step 601). The HMI manager builds a model of available controls based on the physical controller connected to the OCU (step 602). Optionally, default values for navigation, accept, back, and cancel may be reserved for on-screen controls and not made available to payloads (step 603). Requested controls are mapped to physical buttons based on the type of button or number of axis requested (step 604). For example, steering requires a left and right axe but acceleration requires a single axe. The HMI manager builds a table of payload events to payload defined callback functions that are executed on the OCU (step 605). The HMI manager builds an image for each payload's mapped controls to be displayed to the operator so they are aware of what button maps to which function (step 606). This is generated dynamically and may be adapted depending on the physical controller connected to the OCU. During normal operation, the operator presses on a joystick (step 607) to, for example, accelerate the platform forward. The HMI manager processes the joystick event and matches it to the corresponding payload defined callback function that is executed on the OCU (step 608). The callback function may generate a message using a custom message object that will be sent to the payload (step 609). In the above example, to accelerate at a rate corresponding to where the user moved the joystick.

Figure 7:
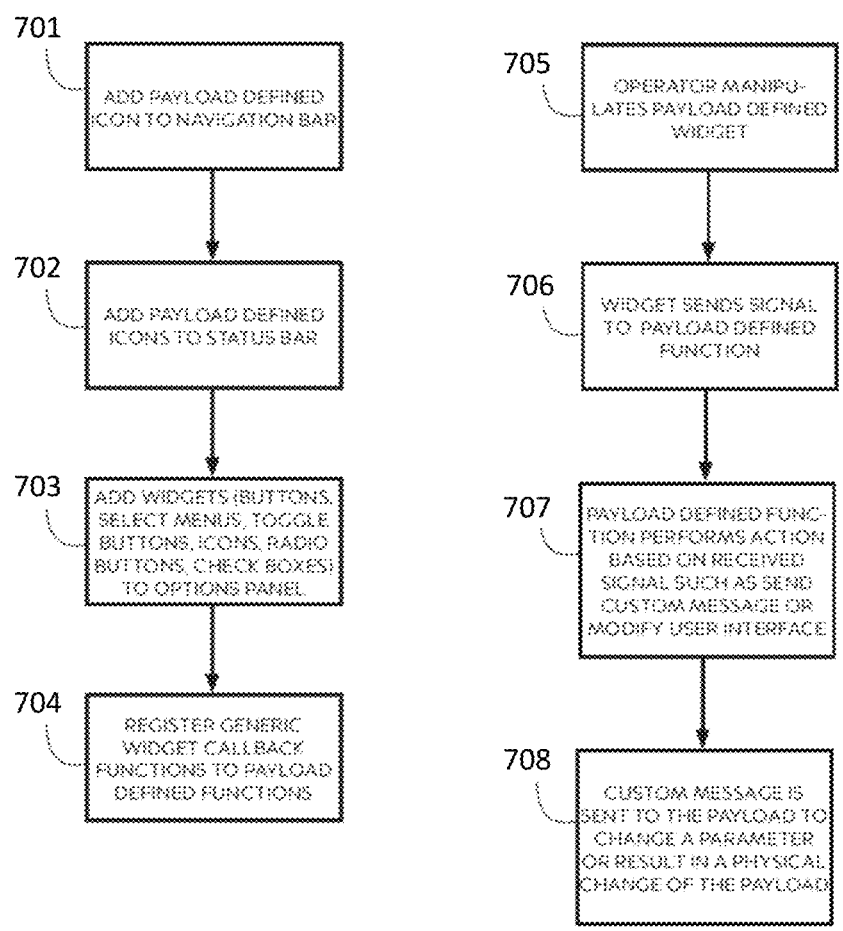
FIG. 7 is a diagram showing payload defined on-screen controls.

FIG. 7 illustrates one example of a payload-defined on-screen controls. On-screen controls are populated when the payload is discovered and initialized (step 701). The OCU may utilize a top navigation bar and a bottom status bar with icons and text labels. Each payload must provide a navigation icon in the QML or XML payload definition. A payload may optionally provide status icons that can be changed during operation (step 702). For example, a payload may provide a compass value and the icon will rotate as the robotic platform rotates in its environment giving a visual indicator to the operator. Additionally, the payload may optionally define user interface elements in the QML or XML payload definition used for controlling components on the payload (step 703). These may consist of buttons, menus, toggle buttons, icons, radio buttons, check boxes, or a custom widget defined by the payload. For example, a camera payload may have a button to control an illuminator. The operator can toggle this when they encounter a low-light situation. The widget defined by the payload is mapped to a callback function that will be executed on the OCU (step 704). Under normal operation, when a user wishes to interact with a payload, they will navigate using the joystick, click the widget with a mouse or touchpad, or tap the screen if a touchscreen is available (step 705). The widget receives the HMI event and generates a corresponding action event that is routed to the mapped payload defined callback function (step 706). The payload defined callback function is executed on the OCU and may optionally send a message using a custom message object (step 707). In the above example, a user navigates to a button using the joystick, presses the standard "Accept" button, the OCU executes the payload defined function which creates a custom message object with an argument enabling the illuminator. The payload will decode the message generated using the custom message object and perform the desired action (step 708). In the above example, the payload may power on the illuminator.

Figure 8:
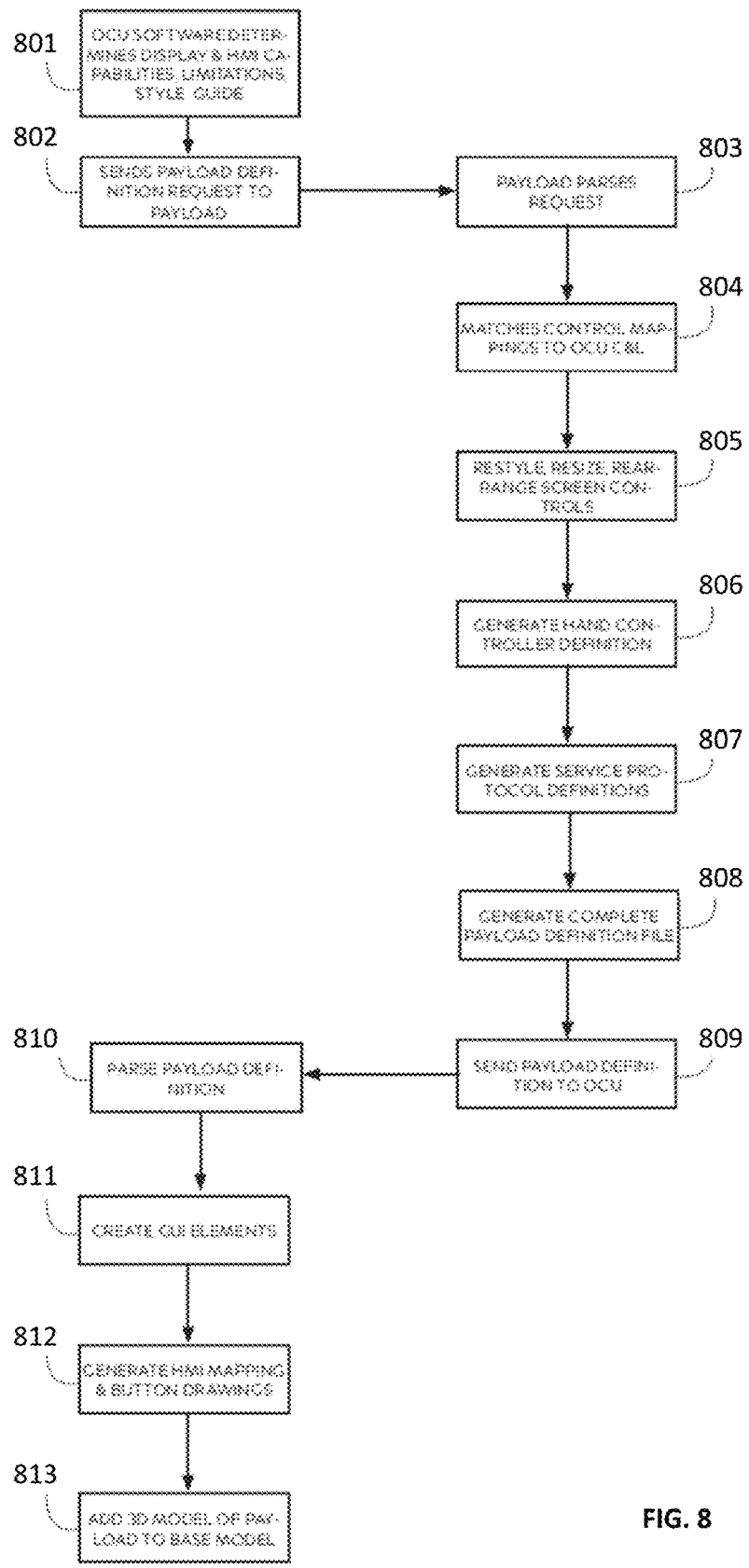
FIG. 8 is a diagram showing OCU defined capabilities and limitations.

FIG. 8 illustrates one example of OCU-defined capabilities and limitations. The OCU software may run on a variety of platforms and hardware such as laptop, desktop, server, tablet, and phone with a variety of human interfaces such as keyboards, mouse, joystick, touch screen, etc. The OCU software will query the hardware available and generate a list of capabilities and limitations for payloads to use to adapt their definitions to the platform to which they are connecting (step 801). After discovering a payload, the OCU may send this definition along with the request for the payload's definition file (step 802). The payload may parse the capabilities and limitations of the OCU (step 803). The payload may adapt and match the control mappings it requires for operation to what is available on the OCU (step 804). Given the OCU screen size provided by the OCU as part of the capabilities and limitations, the payload will resize any visual controls so they may fit on the screen (step 805). In addition to size, styles and color pallets provided by the OCU may be adapted by the payload. This allows for different payloads to offer the same user experience on a given OCU. Based on the available controls such as joystick axes and buttons, the payload will generate the HMI requests for the OCU to fulfill (step 806). By taking into account what is physically available on the OCU, these requests from the payload are more likely to be fulfilled by the OCU. Protocol definitions are generated given the available HMI interface (step 807). These allow the OCU to communicate to the payload without any prior configuration. The payload generates a complete definition describing how it must be integrated into the OCU by the OCU (step 808). This may include a pre-defined 3D model of the payload and the location identifier the payload received from the platform to which it is connected. If the payload represents the base chassis, the definition will specify it is the origin of the platform. If the payload contains connection points for other payloads (as in the case of the chassis), it will provide location identifiers that connected payloads will include in their definition. The payload may transmit this dynamic file to the OCU (step 809). The OCU parses and validates the definition provided by the payload (step 810). Graphical elements such as buttons, toggles, menus, images, etc. are generated by the OCU using the payload definition as a guide (step 811). The mapped functions on any attached controller are created and a graphical representation is generated to provide the operator an understanding of the functions of the buttons and axes on the controller (step 812). Given the 3D model and connection identifier provided by the payload, the OCU will generate a visual representation based on the origin mapped from the base payload (chassis) (step 813). In the case of stacked payloads such as a camera connected to an arm, the origin point of the camera will be the arm and the OCU will move the camera and arm together as the arm moves.

Figure 9:
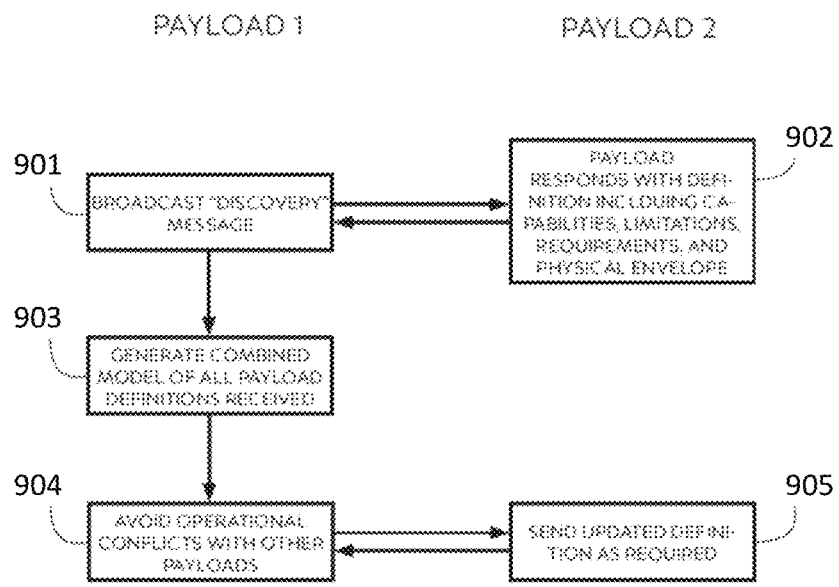
FIG. 9 is a diagram showing payload to payload communication.

In addition to communicating with the OCU, the payloads may also communicate with one another. FIG. 9 is one example of payload-to-payload communication. Payloads may communicate their capabilities, limitations, requirements, and physical envelope to other payloads requesting such information. All components such as the chassis, payloads connected to the chassis such as an arm, and payloads connected to other payloads like a camera to an arm, use the same protocol. Payload-to-payload communication is a desirable component in building a dynamic robotic system that must incorporate and integrate a wide range of payloads. Simply loading a configuration file on the OCU is not sufficient when deploying real-world robotic systems to end users. For example, a robotic platform may contain multiple arms or articulating cameras that must avoid interfering with each other. If an arm were to collide with another arm while performing a dangerous operation, the robotic system and user may be at risk. To avoid these conflicts, the payloads may discover each other and coordinate their activities with each other to avoid damage. While the operator may attempt to avoid collisions between, for example, and arm and a camera, delays between the OCU and robotic platform require a dedicated solution on the part of the payloads that move within their environment. This may be accomplished by a single payload periodically sending messages of its physical envelope to other payloads that request updates. If two arms are attached to a robotic platform, they will subscribe to each other's changes in physical envelope and guard against motion that may cause a collision. When a payload determines its motion must be stopped to avoid collision, it may send a message to the OCU to indicate to the operator that the collision was avoided. Shifting the role of collision avoidance to the payloads, rather than the platform as in other implementations, the robotic system can better support a wide range of automatically integrated payloads. On startup, payloads will broadcast discovery messages for others to respond to (step 901). Upon receiving a discovery message, a payload will respond with its own capabilities, limitations, requirements, and physical envelope (step 902). For example, Payload #1 will generate a model of all other payload definitions received (step 903). This may be updated during operation based on periodic intervals or based on change events. The payload receiving this message may adapt its operation based on the other payloads' capabilities, limitations, requirements, and physical envelope (step 904). This includes collision avoidance with other payloads (such as an arm colliding with other payloads). If any of the capabilities, limitations, requirements, and physical envelope change over time, the payload will send an updated definition (step 905).

In addition to communication between attached payloads, the robotic platform may also warn payloads to avoid a physical configuration that may jeopardize the stability of the platform to avoid the robotic system from tipping over. For example, an arm may have a long reach and may pick up heavy objects. The arm knows the weight of its individual joints and can calculate the weight of the item it picks up based on the torque required by individual joints. From this information, the arm may calculate a center of mass and make this available to other payloads and the robotic platform. If the platform calculates, based on the other centers of mass provided by other payloads and its own center of mass, that a tipping situation is imminent, the platform may either warn the payload that is causing the problem, in this case the arm holding a heavy object, or the platform may adapt itself by extending stabilizing articulators. In either solution, the robotic system is resolving the tipping situation through communication between the attached payloads without direct operator intervention.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

It will be appreciated that the various dependent claims and the features set forth therein can be combined in different ways than presented in the initial claims. It will also be appreciated that the features described in connection with individual embodiments may be shared with others of the described embodiments.

What is claimed is:

1. A method of communication between at least one payload and a platform, comprising:
   physically coupling the at least one payload to a platform so that a surface of the at least one payload is in contact with a surface of the platform;
   providing power to the at least one payload via the platform;
   periodically sending an identification message from the at least one payload to the physically coupled platform via a serial bus;
   decoding the identification message with the platform and sending a response message to the at least one payload;
   requesting access to one or more ethernet busses supplied by the platform;
   enabling the one or more ethernet busses only after confirmation of a proper identification message;
   sending a Qt Modeling Language (QML) file from the at least one payload to an operator control unit, the QML file defining user and logical interface requirements;
   sending an Extensible Markup Language (XML) service definition from the at least one payload to the operator control unit;
   parsing the XML service definitions; and
   generating Human Machine Interface (HMI) mapping and button drawings for each of the at least one payload.

2. The method of claim 1, wherein the identification message includes the at least one payload's make, model, version, serial number and other identifying information.

3. The method of claim 1, wherein the identification message includes a cryptographic signature.

4. The method of claim 1, wherein the response message includes the platform's make, model, version, serial number or other identifying information.

5. The method of claim 1, further comprising the step of creating at least one graphical user interface element.

6. The method of claim 1, wherein the at least one payload includes multiple payloads comprising at least a camera and a manipulator.

7. The method of claim 1, further comprising sending payload port identifying information from the platform.

8. The method of claim 1, wherein the at least one payload comprises at least one of an arm, a gripper, a camera, a radio and a sensor.

9. The method of claim 1, further comprising carrying the least one payload on the platform.

10. The method of claim 1, further comprising transporting the least one payload via the platform.

* * * * *